Oct. 3, 1939.  R. A. GILBERT  2,175,022
RESISTANCE BUTT WELDING MACHINE
Filed Dec. 31, 1938  2 Sheets-Sheet 1
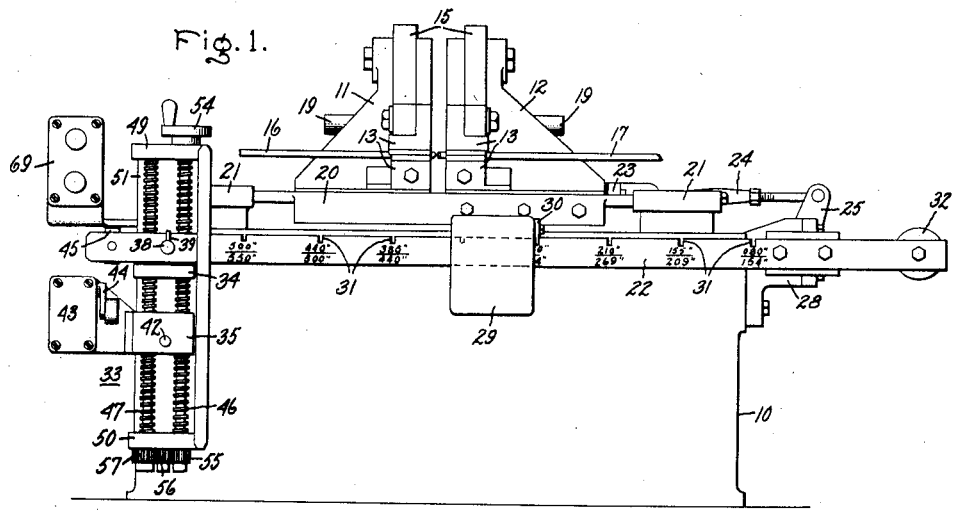
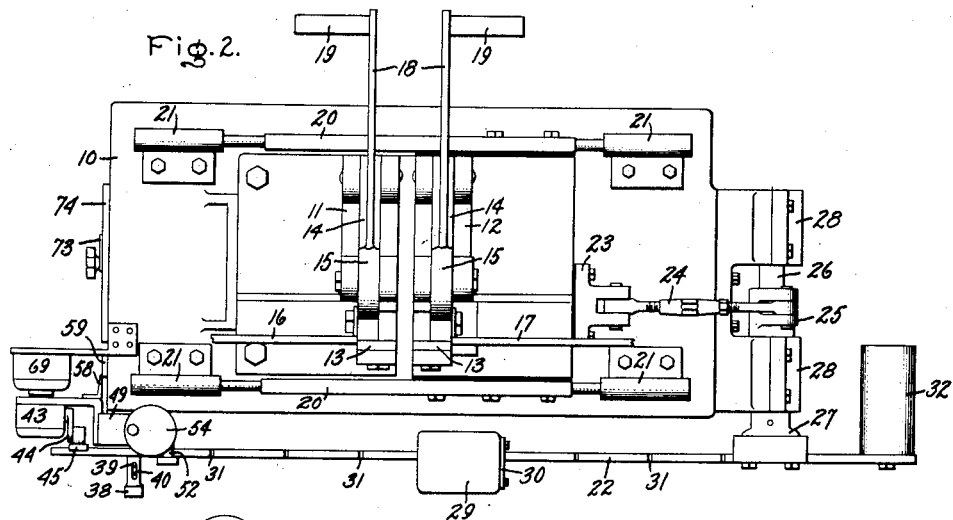
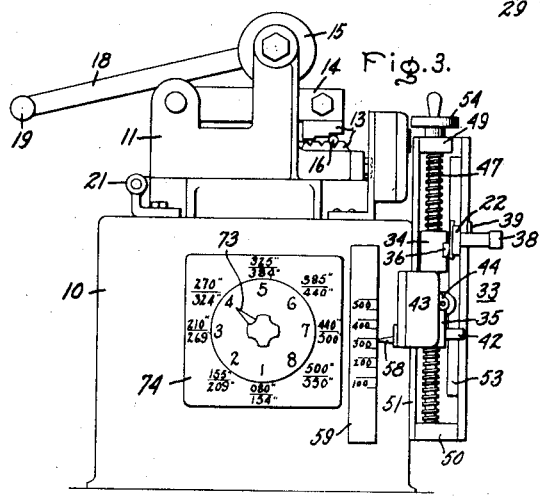
Inventor:
Ralph A. Gilbert,
by Harry E. Dunham
His Attorney.

Oct. 3, 1939. R. A. GILBERT 2,175,022
RESISTANCE BUTT WELDING MACHINE
Filed Dec. 31, 1938 2 Sheets-Sheet 2
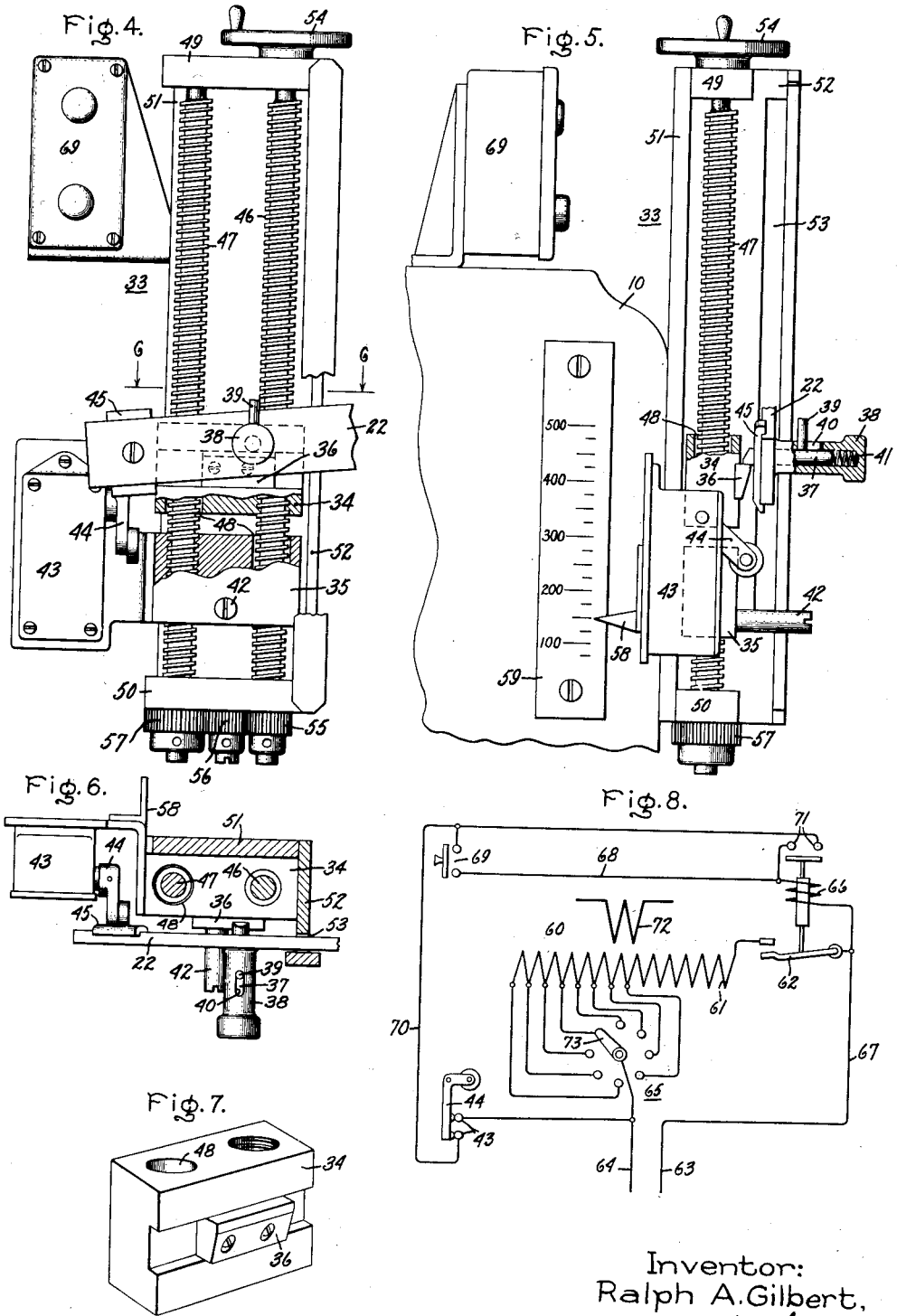
Inventor:
Ralph A. Gilbert,
by Harry E. Dunham
His Attorney.

Patented Oct. 3, 1939

2,175,022

UNITED STATES PATENT OFFICE 2,175,022

RESISTANCE BUTT WELDING MACHINE

Ralph A. Gilbert, Pittsfield, Mass., assignor to General Electric Company, a corporation of New York Application December 31, 1938, Serial No. 248,814

6 Claims. (Cl. 219—4)

My invention relates to resistance welding, and more particularly to a resistance butt welding machine of improved construction.

It is an object of my invention to provide a resistance butt welding machine in which the welding current, the welding pressure, and the time or amount of upset for different sizes of work are correctly predetermined in accordance with scales graduated in work size.

It is another object of my invention to provide a device including a scale graduated in work size for simultaneously setting the initial spacing and the travel of the jaws of a resistance butt welding machine in accordance with the size of the work being welded.

Further objects of my invention will become apparent from the following description of the embodiment illustrated in the drawings, Figs. 1, 2 and 3 of which show front, top and end views of a resistance butt welding machine embodying the several features of my invention; Figs. 4, 5 and 6 of which show front, side and top sectional views along line 6—6 of Fig. 4 of the device for simultaneously setting the initial spacing and the travel of the jaws of the welding machine in accordance with the size of the work being welded; Fig. 7 of which is a perspective view of the latch support forming part of the device illustrated in Figs. 4, 5 and 6; and Fig. 8 of which is a wiring diagram illustrating the manner in which the welding transformer is adjusted as well as the manner in which its energization may be controlled.

The resistance butt welding machine illustrated in Figs. 1, 2 and 3 comprises a frame 10 which encases the welding transformer as well as a tap switch by means of which the welding current is adjusted. Relatively movable work holders 11 and 12 are supported on the top of this frame. Each of these work holders is provided with jaws 13 whose work engaging surfaces are proportioned relative to one another to accommodate wires of different sizes. The lower jaws are bolted to the bases of the work holders 11 and 12 and the upper jaws are bolted to the free ends of levers 14 which are pivotally supported at their other ends in hinge lugs forming part of the work holders. The jaws 13 are normally held in separated positions by springs (not shown) located between the levers 14 and the bases of the work holders. Cams 15 rotatably supported between lugs forming part of each work holder engage the levers 14 intermediate their ends and apply the necessary clamping pressure to the jaws 13 for holding the wires 16 and 17. These cams 15 are rotated relative to the work holders by levers 18 attached thereto. Each lever is provided with a handle 19.

The work holder 12 is slidably supported relative to the work holder 11. The work holder 11 is bolted to the top of the frame 10 and the work holder 12 is supported and bolted between and electrically insulated from the guide rods 20 whose ends have bearings in brackets 21 which are also bolted to the top of the frame 10. The work holder 12 is moved relative to the work holder 11 by a pressure lever 22 which is connected therewith through a linkage comprising the insulated hinge lug 23, turnbuckle lever 24, crank arm 25, and shaft 26. The lever 22 is bolted to the end surface of a coupling 27 which, together with the crank 25, is firmly attached to the shaft 26. This shaft is supported in bearings 28 bolted to the right-hand side of the frame 10. The hinge lug 23 is bolted to the end of the movable work holder 12.

A weight 29 slidably supported on the lever 22 is employed for applying the proper welding pressure between the wires 16 and 17 clamped in the jaws 13 of the work holders 11 and 12. The weight 29 is positioned relative to the lever 22 by the engagement of its latch 30 with notches 31 located in the top edge surface of the lever. These notches 31 are properly located with regard to the size of the weight 29 for applying the proper welding pressure for different wire sizes which are applied as a scale to the lever opposite each notch. The end of the lever 22 which projects to the right of the coupling 27 may be provided with a counterweight 32 in order to assist in obtaining the desired calibration.

The initial position of the lever 22 determines the spacing of the jaws 13 and the extent of movement of this lever determines the travel of these jaws during welding. The initial position of the lever 22 as well as its travel during welding is determined by a device 33. As more clearly shown in Figs. 4, 5 and 6, this device includes adjustable members 34 and 35 located in the path of travel of the left-hand end of the lever 22. The member 34 is provided with a catch 36 which may be engaged by a latch 37 attached on the front left end of the lever 22. The movement of this latch 37 is controlled by pin 39 which projects through a slot 40 in the handle 38. The latch 37 is normally biased by a spring 41 so that it projects beyond the inside surface of the lever a sufficient amount to engage the catch 36 supported on member 34. The downward movement of the lever 22 is arrested by a pin 42 mounted on the front surface of the member 35 in the path of travel of the lever 22. The member 35 also acts as a support for a limit switch 43 whose operating member 44 is in the path of travel of a cam 45 which is attached to the back left end of the lever 22.

In the arrangement illustrated, the members 34 and 35 are nuts each of which engages parallel screws 46 and 47 having threads of the same pitch. The member 34 is in threaded engagement with the screw 46 and the member 35 is in threaded engagement with the screw 47. Each member is provided with unthreaded openings 48 through which the operating screw for the other member passes. These openings 48 may constitute a bearing by reason of their engagement with the edge portions of the threads on screws 46 and 47. The ends of the screws 46 and 47 are supported in bearings located in the end flanges 49 and 50 of a bracket 51 which is attached to the frame 10 of the machine. This bracket is also provided with a side flange 52 having a slot 53 through which the left end of the lever 22 extends. The upper end of the screw 46 is provided with a hand wheel 54 by means of which it may be rotated. The lower ends of the screws 46 and 47 are connected by gears 55, 56 and 57, gears 55 and 57 being attached to the lower ends of the screws 46 and 47 and gear 56 being supported on a bearing mounted on the flange 50 of the bracket 51. It is to be noted that the gear 57 attached to the screw 47 is provided with a greater number of teeth than the gear 55 which is attached to the screw 46. Consequently, the rotation of the hand wheel 54 will cause the member 34 to travel a greater distance along the screw 46 than the member 35 travels along the screw 47. This will produce a progressively greater separation between the members 34 and 35 as they travel upward on the screws 46 and 47. One of these members 35, for example, may be provided with an index 58 which is positioned relative to a scale 59 graduated in work size. The scale 59 may be attached to the left end of the frame 10 of the welding machine. The movement of the member 35 and the pointer 58 mounted thereon relative to the scale 59 is so related to the relative movement of the members 34 and 35 that the initial setting of the lever 22 and its travel during welding is set in accordance with the initial spacing and the travel of the welding jaws required for different sizes of work.

As illustrated in Fig. 8, the limit switch 43 is in a control circuit for the welding transformer 60. One terminal of the primary 61 of this welding transformer is connected through a switch 62 to one terminal 63 of a source of supply 63, 64. The other terminal 64 of this source of supply is connected through a tap switch 65 to taps on the primary winding 61 which are properly selected for controlling the welding current in accordance with the size of the work being welded. The switch 62 is provided with an operating coil 66 which is energized from the source of supply 63, 64, through conductors 67 and 68, start switch 69, conductor 70, and limit switch 43. Start switch 69 may be suitably located on the frame 10 of the welding machine as illustrated in the drawings. The switch 62 is also provided with auxiliary contacts 71 which are in shunt to the contacts of the switch 69 and complete a holding circuit for the switch 62 once it has been energized. The switch 66 is deenergized by the opening of limit switch 43 which is controlled by the movement of the lever 22 as above described.

The terminals of the secondary 72 of the welding transformer 60 are connected to the work holders 11 and 12 and, consequently, welding current is supplied through these work holders to the work jaws 13 forming part thereof.

The tap switch 65 has eight positions which are indicated by a pointer 73 on a dial 74 located on the left end portion of the frame of the welding machine. This dial is provided with indicia opposite each tap position which indicates the size of work which may be welded when the tap switch is in any one of these eight positions.

It will thus be seen that I have provided a resistance butt welding machine in which only three simple adjustments are required to set the machine for any given wire size. For example, assume that a .300" wire is to be welded. The tap switch 65 will be properly set by positioning its pointer 73 in position No. 4 which, according to the current setting dial 74, will provide a sufficient amount of current for welding wires between .270" and .324" in diameter. Then the pressure weight 29 will be set on the notched lever 22 so that its latch 30 engages the notch on the lever which is calibrated for wires between .220" and .324". The proper jaw spacing and weld travel are next determined by setting the device 33 so that the pointer 58 attached to the member 35 is positioned opposite the wire size .300" appearing on the scale 59. The lever 22 is then latched on the member 34 and the wires 16 and 17 are then clamped in the jaws 13 by operating the clamping levers 18. It is important to cut the wires off square so that their ends have wedge shaped points of approximately 100° to 120° included angle, as illustrated in Fig. 1. A properly constructed wire cutting device may be used for obtaining the desired wedge shaped ends. The wires should be clamped in the jaws 13 so that they project substantially equal amounts therefrom and so that their wedge shaped points are at right angles to each other and in engagement with one another, as shown in Fig. 1. The lever arm 22 is then unlatched from the member 34 by withdrawing the latch 37 in the handle 38 of the lever. This will allow the lever to drop slightly and apply the pressure of weight 29 to the wire ends. The welding operation is initiated by closing the switch 69 which energizes the operating coil 66 of the switch 62 which, upon closing, connects the primary 61 of the welding transformer 60 to the source of supply 63, 64. Upon completing this connection welding current is supplied from the secondary 72 of the welding transformer 60 to the work holders 11 and 12 which supply the current to the wires 16 and 17 through jaws 13 in which the wires are clamped. The ends of the wires are heated by the flow of welding current to a welding temperature as the welding jaws are pushed toward each other through the agency of the weighted lever 22 to forge and upset the weld. As the lever 22 drops to its lower position determined by the pin 42 on member 35, cam 45 on the lever 22 engages the operating member 44 of the limit switch 43, opening the same. The opening of the limit switch 43 deenergizes the operating coil 66 of the switch 62 which then opens and disconnects the primary of the welding transformer from its source of supply. When the lever 22 reaches its final position the weld between the wires 16 and 17 has been completed and the welded assembly is then removed from the machine after the clamps 13 of the work holders 11 and 12 have been released by the proper operation of the clamping levers 18.

It is apparent that the machine above described may be variously modified without departing from my invention. For example, the device 33, which in conjunction with the lever 22 constitutes means for simultaneously setting the initial spacing and the travel of the welding jaws in accordance with the size of the work being welded, may be variously modified. Instead of using screws 46 and 47 having threads of substantially the same pitch, these screws may have threads of different pitch and may be rotated the same amount through a suitable agency such as a hand wheel 34 attached to one of the screws. For that matter, a suitable linkage may be provided for obtaining the desired progressive separation of members 34 and 35 in accordance with the size of the work to be welded. Any arrangement whereby the spacing of the members 34 and 35 is properly determined may be employed. When welding small wires the members 34 and 35 should be located close together so as to obtain the desired spacing of the welding jaws as well as the upset suitable for making a weld between small wires. On the other hand, when welding large wires the members 34 and 35 must be separated a greater amount in order to allow for a greater spacing of the welding jaws as well as the greater upset required in making a weld between large wires.

Furthermore, the device 33 may exercise its control directly on the wire holder instead of functioning through the agency of a weighted lever 22 as in the arrangement described. Instead of using a weighted lever 22 for applying welding pressure, other suitable arrangements may be employed. It is also apparent that the cut-off switch 33 may be associated with the work holders in any suitable manner so as to be responsive to a predetermined relative movement of the work holders and their clamping jaws toward one another. Aside from embodying the limit switch 43 and the tap switch 65, any control other than that illustrated in Fig. 8 may be employed for initiating and controlling the supply of welding current.

Modifications other than those above referred to will readily occur to those skilled in the art, and I intend consequently to cover by the appended claims all those modifications and variations which come within the true spirit and scope of my invention.

What I claim as new and desire to secure by Letters Patent of the United States is:

1. A resistance butt welding machine comprising relatively movable work clamping jaws, means including a scale graduated in work size for simultaneously setting the initial spacing and the travel of said jaws in accordance with the size of the work being welded, means acting on said jaws for applying welding pressure to the work clamped in said jaws, and means including a scale graduated in work size for setting the welding pressure in accordance with the size of the work being welded.

2. A resistance butt welding machine comprising relatively movable work clamping jaws, means including a lever for moving said jaws relatively to one another, means including adjustable members in the path of travel of and cooperating with said lever for setting the initial spacing of said jaws and for limiting the travel of said jaws toward one another in accordance with the size of the work being welded, means for separating said adjustable members predetermined amounts depending on the movement of one of said members, and means including a scale graduated in work size for adjusting said one of said members to predetermined positions for different sizes of work.

3. A resistance butt welding machine comprising two relatively movable work clamping jaws, means for moving one of said jaws relatively to the other of said jaws, a member positively connected with said one of said jaws and having a movement proportional to its movement, means including adjustable members in the path of travel of and cooperating with said first-mentioned member for setting the initial spacing of said jaws and for limiting the travel of said jaws toward one another in accordance with the size of the work being welded, means for separating said adjustable members predetermined amounts depending on the movement of one of said members, and means including a scale graduated in work size for adjusting said one of said members to predetermined positions for different sizes of work.

4. A resistance butt welding machine comprising relatively movable work clamping jaws, means including a scale graduated in work size for adjusting the welding current for different sizes of work, means including a pivotally supported lever and weight adjustably located thereon for moving said jaws relatively to one another, said lever being provided with indicia for locating said weight relative thereto in accordance with the welding pressures required for different sizes of work, means including a plurality of members located in the path of movement of said lever and cooperating therewith for positioning said lever and for an initial spacing of said jaws and for limiting the travel of said lever for a predetermined work upsetting travel of said jaws, means for separating said members predetermined amounts depending on the movement of one of said members, and means including a scale graduated in work size for adjusting said one member to predetermined positions for different sizes of work.

5. A resistance butt welding machine comprising relatively movable work clamping jaws, means including a pivotally supported lever and weight adjustably located thereon for moving said jaws relatively to one another, said lever being provided with indicia for locating said weight relative thereto in accordance with the welding pressures required for different sizes of work, means for positioning said lever for the jaw separation required for different sizes of work, means for releasing said lever from the control of said positioning means, means for limiting the travel of said lever from said positioning means in accordance with the upset required for effecting a weld between different sizes of work, and means including a scale graduated in work size for simultaneously setting said positioning means and said travel limiting means relatively to one another for the jaw separation and upset required for different sizes of work.

6. A resistance butt welding machine comprising relatively movable work clamping jaws, means including a pivotally supported lever and weight adjustably located thereon for moving said jaws relatively to one another, said lever being provided with indicia for locating said weight relative thereto in accordance with the welding pressures required for different sizes of work, means for positioning said lever for the jaw separation required for different sizes of work, means for releasing said lever from the control of said positioning means, means for limiting the travel of said lever from said positioning means in accordance with the upset required for effecting a weld between different sizes of work, means including a scale graduated in work size for simultaneously setting said positioning means and said travel limiting means relatively to one another of the jaw separation and upset required for different sizes of work, means for supplying welding current to said jaws, means including a scale graduated in work size for adjusting the welding current for different sizes of work, means for initiating the flow of welding current to said jaws, and means responsive to the movement of said lever for interrupting the flow of welding current after a predetermined movement of said lever.

RALPH A. GILBERT.

CERTIFICATE OF CORRECTION.

Patent No. 2,175,022.     October 3, 1939.

RALPH A. GILBERT.

It is hereby certified that error appears in the printed specification of the above numbered patent requiring correction as follows: Page 3, second column, line 37, claim 4, strike out "and" first occurrence; page 4, first column, line 9, claim 6, for "of" read for; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.